May 12, 1959
J. L. JONKE
2,886,679
ELECTRIC PRESSURE TRANSDUCER
Filed April 23, 1957
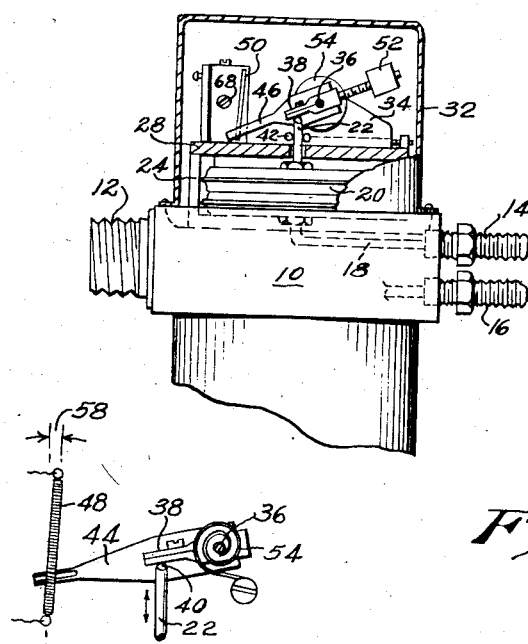
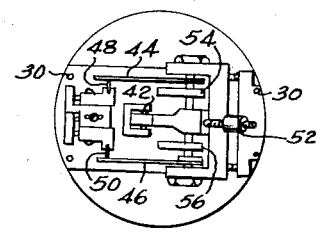
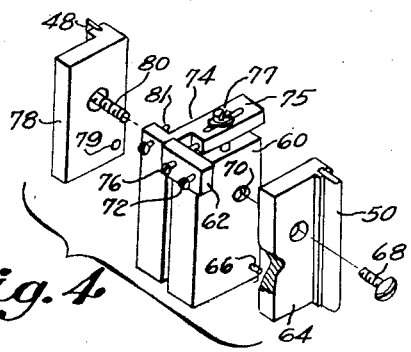
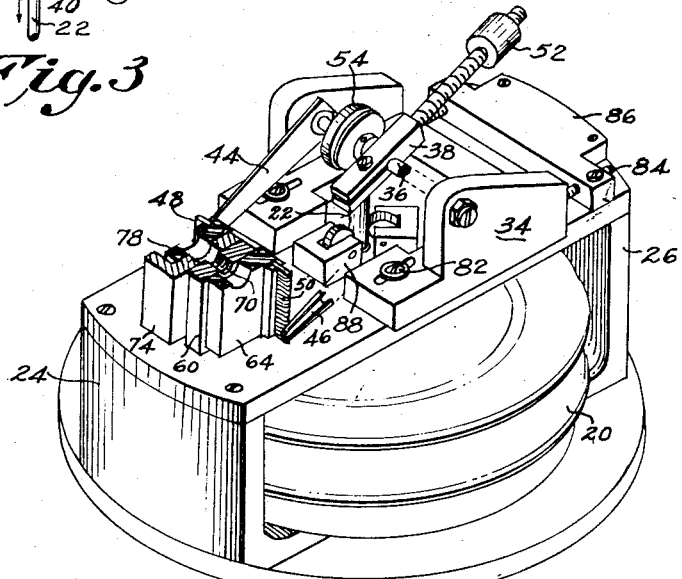
INVENTOR:
J. L. JONKE
BY Homer R. Montague
ATTORNEY United States Patent Office 2,886,679
Patented May 12, 1959

2,886,679

ELECTRIC PRESSURE TRANSDUCER

Joseph L. Jonke, Bethpage, N.Y., assignor to Fairchild Camera and Instrument Corporation, a corporation of Delaware Application April 23, 1957, Serial No. 654,564

4 Claims. (Cl. 201—48)

This invention pertains to transducers, by which is meant devices for converting a relatively small amount of mechanical movement of a part into a signal, particularly an electrical signal, for control or measurement purposes or for transmission to a remote location. Such devices are widely used in telemetering and servo control systems, and in many applications must satisfy a large number of often conflicting requirements as to size, weight, accuracy of response and similar factors.

The transducer of the present invention is intended particularly for application to the problem of converting values of fluid pressure, either absolute or differential, into suitable electrical control or output signals, but since basically its first converts the pressure value into the mechanical motion of a part, many of its features are equally applicable to transducers for converting other variables, translatable into terms of motion, into electrical signals. It may also be stated that for purposes of illustration and example, the transducer to be described in detail herein is of the type in which the output signal is obtained from a varying resistance (potentiometer or the like) controlled by the mechanical movement; here again, certain features of the arrangement are applicable also to transducers employing other means for converting motions into signal changes.

It is accordingly a principal object of the invention to provide an improved form of electrical transducer characterized by its adaptability to various problems in the telemetering and allied fields. More specifically, it is an object of the invention to provide a transducer in which the electrical output signal may be made to follow, accurately and reliably, a change in the control or input magnitude, either linearly or with a predetermined functional relationship.

A further object of the invention is to provide a transducer of the type indicated which is very compact, considering the high degree of fidelity of its output, and which can therefore be employed in applications where size, weight and complexity must be kept to a minimum.

Still another object of the invention is to provide a transducer of the type indicated above in which precise calibration of the device, to yield an accurate desired form of response, can readily be achieved, without imposing impractically close tolerances on the manufacturing process.

A collateral object of the invention is to provide such a transducer which is fabricated of readily separable parts, to the end that initial calibration can be simplified, and also so that the same components, manufactured in quantity, can be utilized in various different combinations to suit particular requirements.

Yet another object of the invention is to provide an electrical output transducer having the above-indicated advantages, and whose design imposes a minimum mechanical load on the input to the instrument, so that the sensitivity of the device is increased without requiring excessive energy drain from the input system. Thus, for example, the sensitivity is adequate to respond accurately to changes in air flow as in an air speed indicator, or alternatively to indicate accurately the position of any mechanical part without substantially interfering with the movements of the latter.

The above and other objects and advantages of the invention are obtained by a combination of correlated features whose manner of cooperation will best be understood by referring now to the following detailed specification of a preferred embodiment thereof, taken in connection with the accompanying drawings, in which:

Fig. 1 is a side elevation, partly broken away and partly in section, of a pressure transducer in accordance with the invention, and providing a pair of adjustable potentiometers as the electrical signal-producing components.

Fig. 2 is a plan view of the same device.

Fig. 3 is a schematic view, to a larger scale, showing the relationship between one potentiometer resistance element, its wiping contact arm and the mechanically moving push rod of the pressure-responsive bellows.

Fig. 4 is a fragmentary perspective view, slightly exploded, of a preferred way of adjustably mounting the resistance elements.

Fig. 5 is a perspective view, with parts removed for clarity, showing the general arrangement of the transducer device.

The particular transducer selected for illustration herein, as an exemplary embodiment of the invention, is of the dual type providing facilities for translating two independent values of fluid pressure into respective resistance values; each of its halves is actually a complete transducer, and the dual arrangement is illustrated to exemplify especially the compact design of the device. Moreover, each of the transducers of the dual device illustrated is provided with a pair of adjustable resistances, each resistance element having its own respective contact wiper arm; this feature permits great circuit flexibility, but is to be understood as not limiting, in that similar devices having only a single resistance element can readily be made within the scope of the invention and its novel principles.

Turning now to Fig. 1 of the drawings, the dual transducer to be described comprises a main body or housing 10 having suitable connections for the fluid pressure conduits and for the electrical leads from which the output signals or resistance values are obtained. Thus, from one edge of housing 10 extends a conventional cable connector 12, while from an opposite edge, for example, extend a pair of fluid pressure connectors or threaded nipples 14 and 16. For brevity of description, only one of the duplicate halves of the dual transducer will be described in detail. The connector 14, for example, is connected via conduit 18 with the interior of an expansible bellows 20 of known type, suitably mounted on a support plate provided by the housing 10. The upper face of bellows 20 has secured thereto a push rod 22 forming the mechanically moving part whose position in its lengthwise direction responds to variations of pressure in conduit 18, in a known manner.

Also secured to and carried by housing 10 is a transducer support providing a pair of upwardly extending legs 24 and 26 (only the former being visible in Fig. 1), to which is removably attached a transducer mechanism support plate 28. The legs 24 and 26 partially encompass the bellows 20, and are in fact portions of a cylinder acting to support the mechanism plate 28 rigidly with reference to the bottom of the bellows 20, and providing free space for the expansion of the same.

The bellows push rod 22 extends upwardly through a central hole in the plate 28, and since its movement is purely in the direction of its length, it will be clear that the entire assembly carried upon plate 28 can readily be removed in an upward direction, in Fig. 1, when its securing screws as at 30 are removed. A sealed protective cover or shell 32 is provided as shown.

A bracket assembly 34 is secured to the upper face of mechanism plate 28 for limited adjustment toward and away from the central hole which receives the push rod 22; that is, along a diameter of the plate 28. Between the upright legs of the bracket is journalled a pivot shaft 36 to which is secured a relatively short arm 38 one end of which is disposed to be engaged by a hardened steel ball or like contact element 40 at the tip of the push rod. Movements of the push rod in its lengthwise direction thus rotate arm 38 and shaft 36. To ensure strictly lengthwise motion of the push rod, while imposing a minimum frictional load thereon, the mechanism plate 28 carries, for example, three anti-friction rollers or ball bearings disposed at equal angles about the push rod; the position of these is indicated at 42. It will be observed that the presence of these rollers does not interfere with the free removal of the mechanism plate 28 and the parts carried thereby.

Also carried by the shaft 36 are a pair of electrical wiping contact arms 44, 46, which are relatively longer than the short arm 38; the free ends of these contact arms wipe along the edges of resistance elements such as 48, 50. Thus, a pair of potentiometers is provided, the adjustment of each being strictly in accordance with the motion of push rod 22. The electrical connections to the resistances 48 and 50 are not shown in detail, these being conventional leads from the end terminals of each resistance to the terminals of the connector 12. If desired, tapped resistances may obviously be employed for any special purposes to be served. The manner of mounting the resistances will be described in detail below.

Extending from the opposite end of short arm 38 is a threaded shaft on which is adjustably mounted the counterweight 52 to balance the rotating parts, and springs are provided to bias the rotating assembly so that arm 38 contacts the hardened end of the push rod. Preferably, there are a pair of spiral springs such as at 54, 56, to balance the rotating assembly in the lateral direction. As is conventional in electrical meter movements, these biasing springs may also form the electrical leads to the contact or wiper arms 44, 46, in which case the arms will be insulated from the shaft on which they are carried. Both the arm 38 and the wiper arms 44, 46 are preferably arranged for slight adjustments on shaft 36; for example, by making the parts of split construction and providing clamp screws in the well known manner.

The geometry of the configuration will be more clear from an inspection of Fig. 3, which shows the essential parts in operative relationship. The same reference numerals denote the same parts, and it will be obvious that the use of a short arm 38 and a long wiper 44 provides a considerable degree of mechanical amplification of the push rod movement. Where, as above described, the end of push rod 22 terminates in a hardened sphere, the slight tangential error as arm 38 rotates can be compensated for by tilting the resistance element 48 as shown at 58. Provision for this tilt and for other adjustments of the resistance elements will now be described.

Where a single resistance element is used, provision should be made both for adjusting its tilt and its position as a whole toward and away from the axis of the wiper arm. Where, as in the embodiment above described, there are a pair of resistances, their tilts should be adjustable independently of one another, and provision should be made for adjusting the position of at least one with respect to the axle 36, without disturbing the tilt adjustments. Such an arrangement is shown in Fig. 4 of the drawings.

The mechanism plate 28 fixedly supports a block 60 having flat sides and, at its upper rear corner, a rearwardly offset lug 62. One the near flat side (in Fig. 4) an insulating plate 64 is pivoted as by a pin 66 fast in block 60. One resistor 50 is held in plate 64 as by cement or equivalent means, and pivot pin 66 preferably is near the bottom end of the resistor. An enlarged hole in the plate passes a clamp screw 68 threaded into a hole 70 in block 60, so that plate 64 may be tilted as required and then clamped by screw 68. A stop screw 72 threaded in lug 62 provides a precise locating stop for the pivoted position of the plate 64.

On the opposite face of block 60 a support plate 74 is arranged to slide horizontally; it has an upper lip or flange 75 which in assembled condition overlies the level top edge of block 60 and hence forms a guided support movable toward and away from axle 36. A stop screw 76 also threaded in lug 62 provides precise positioning, and a clamp screw 77 threaded in block 60 and passing through a slot in flange 75 secures the adjusted position.

Support plate 74 carries an insulating plate 78 similar in all respects to plate 64, being pivoted at its lower corner upon a pivot pin (not shown) on plate 74, entering hole 79. Plate 78 supports the other resistor 48, whose position fore-and-aft is thus adjustable with plate 74 as above described, and is pivotally secured by clamp screw 80 passing through an oversize hole in plates 74 and 78 and also threaded into hole 70 of block 60. A stop adjustment for the pivot motion is provided by screw 81 threaded in the vertical flange of plate 74, to engage the rear edge of plate 78.

The resistance elements may, of course, be mounted on their insulating cards with an initial tilt of approximately the amount needed to correct any tangent error; the precise calibration and relative "phasing" of the two resistors can then be effected by the independent adjustments described. The contact portion at the end of each wiper arm is sufficiently long to permit the described adjustments; the contact end may be cupped as is usual in the case of a resistor wiper, to achieve substantially point contact with the resistance element.

As best shown in Fig. 5, provision is also made for adjustment of the bracket assembly 34 to ensure that the push rod engages the proper point of the short arm 38. Thus, the bracket base may be slotted to receive clamp screws such as 82, and positional adjustments made by a pair of screws 84 threaded in a block 86 secured to the mechanism plate 28, and arranged to engage the rear edge of the bracket assembly. Fig. 5 also shows more clearly the arrangement of anti-friction rollers for the push rod 22. Each roller may be held in a bracket or journal support 88, and if desired the rollers may be face grooved to fit the push rod precisely; if so, a pair of rollers will often be sufficient to constrain the rod in the desired way.

The hardened steel ball 40 may be replaced by a hardened hemispherical tip integral with the push rod, or a knife-edge contact may be provided. Other anti-friction constraints may be employed for the push rod; for example, jewel bearings, the free end of a cantilever spring and the like. It will be obvious that by suitable known arrangements, the device may measure differential pressure as well as absolute values, this depending solely on the connections to the bellows, diaphragm or like device employed for converting the pressure values to rectilinear motion of a push rod. Other forces capable of moving such a rod may also be measured. The resistance elements may have functional (non-linear in the mathematical sense) windings where desired, and may even be replaced by other types of electrical signal devices such as strain gauges, piezoelectric elements or the like. The under side of short arm 38 may also be shaped as desired, to provide non-linear output functions, and a similar result can be obtained by using non-linear springs and the like for the bellows or diaphragm assembly. Such modifications will occur to those skilled in the art, and are not intended to be excluded from the invention except to the extent required by the scope of the appended claims.

It will be clear from what has been said herein that the invention provides a transducer in which the parts acting to translate mechanical movement into an electrical output are segregated and so mounted that they can be removed as a unit from the rest of the device, and of course can be separately calibrated before assembly. The removal is quite simple, and can be accomplished without disturbing any of the adjustments. Moreover, the relationships between parts carried by mechanism plate 28 can be adjusted without in any way disturbing the other portions of the entire device.

What is claimed is:

1. In a pressure responsive transducer, a pressure responsive means, a shaft extending from the exterior of said pressure responsive means, a mounting plate spaced from said pressure responsive means, an opening in said plate for said shaft, antifriction bearings spaced about said opening to contact said shaft, a lever assembly mounted upon said plate including a transverse shaft, a lever carried on said transverse shaft in such manner that said lever comprises oppositely extending arms, one of said arms positioned for contact at its end by said shaft extending from the pressure responsive means, the other of said arms provided with an adjustable counterbalance, a wiper arm at each end of said transverse shaft, bias means for each of said wiper arms, a resistance assembly mounted upon said plate including a resistance element for contact by each of said wiper arms, and means for independently adjusting the angular position of each of said resistance elements relative to its respective wiper arm.

2. The apparatus as set forth in claim 1 characterized in that the resistance assembly and the lever assembly are adjustable relative to each other.

3. The apparatus as set forth in claim 1 in which said lever assembly is carried by a unitary mount that is adjustable towards and away from said resistance assembly.

4. The apparatus as set forth in claim 1 in which said lever arms are linear and lie in the same plane.

References Cited in the file of this patent

UNITED STATES PATENTS

| | | |
|---|---|---|
| 2,484,030 | Hastings et al. | Oct. 11, 1949 |
| 2,525,095 | Coxon et al. | Oct. 10, 1950 |
| 2,617,912 | Colvin | Nov. 11, 1952 |
| 2,724,760 | Giannini et al. | Nov. 22, 1955 |
| 2,811,619 | Bourns et al. | Oct. 29, 1957 |